United States Patent [19]
Ward

[11] Patent Number: 4,648,958
[45] Date of Patent: Mar. 10, 1987

[54] PROCESS FOR PRODUCING A HIGH QUALITY LUBE OIL STOCK

[75] Inventor: John W. Ward, Yorba Linda, Calif.

[73] Assignee: Union Oil Company of California, Los Angeles, Calif.

[21] Appl. No.: 593,439

[22] Filed: Mar. 26, 1984

Related U.S. Application Data

[60] Continuation-in-part of Ser. No. 531,924, Sep. 13, 1983, Pat. No. 4,517,074, which is a division of Ser. No. 84,761, Oct. 15, 1979, Pat. No. 4,419,271.

[51] Int. Cl.$^4$ .................... C10G 65/10; C10G 65/12
[52] U.S. Cl. .................... 208/59; 208/89; 208/109; 208/110; 208/111; 208/216 R; 208/254 H
[58] Field of Search .................... 208/59, 89, 109, 110, 208/111, 216 R, 254 H

[56] References Cited

U.S. PATENT DOCUMENTS

| | | | |
|---|---|---|---|
| 3,242,068 | 3/1966 | Paterson | 208/111 |
| 3,251,902 | 5/1966 | Garwood et al. | 208/134 |
| 3,267,021 | 8/1966 | Gould | 208/78 |
| 3,277,018 | 10/1966 | Plank et al. | 502/8 |
| 3,312,615 | 4/1967 | Cramer et al. | 208/120 |
| 3,444,071 | 5/1969 | Van Zijll Langhout | 208/59 |
| 3,487,005 | 12/1969 | Egan et al. | 208/59 |
| 3,542,670 | 11/1970 | Erickson et al. | 208/120 |
| 3,617,483 | 11/1971 | Child et al. | 208/59 |
| 3,700,585 | 10/1972 | Chen et al. | 208/111 |
| 3,729,521 | 4/1973 | Gutberlet et al. | 585/475 |
| 3,781,199 | 12/1973 | Ward | 208/89 |
| 3,783,124 | 1/1974 | Ruben et al. | 208/111 |
| 3,788,972 | 1/1974 | Henry et al. | 208/59 |
| 3,790,472 | 2/1974 | White | 208/59 |
| 3,835,027 | 9/1974 | Ward | 208/111 |
| 3,838,040 | 9/1974 | Ward | 208/111 |
| 3,853,742 | 12/1974 | Ward | 208/111 |
| 3,897,327 | 7/1975 | Ward | 208/111 |
| 3,909,450 | 9/1975 | O'Hara | 208/111 |
| 3,926,780 | 12/1975 | Ward | 208/111 |
| 3,929,672 | 12/1975 | Ward | 502/66 |
| 3,945,943 | 3/1976 | Ward | 502/66 |
| 3,992,283 | 11/1976 | Hutchings | 208/59 |
| 3,997,618 | 12/1976 | Cornely et al. | 585/481 |
| 4,002,698 | 1/1977 | Kaeding | 585/454 |
| 4,061,724 | 12/1977 | Grose et al. | 423/335 |
| 4,062,809 | 12/1977 | Ward | 502/219 |
| 4,085,068 | 4/1978 | Gallagher et al. | 502/254 |
| 4,089,775 | 5/1978 | Berger et al. | 208/111 |
| 4,097,365 | 6/1978 | Ward | 208/111 |
| 4,104,294 | 8/1978 | Grose et al. | 502/62 |
| 4,115,248 | 9/1978 | Mulaskey | 208/112 |
| 4,120,825 | 10/1978 | Ward | 502/64 |
| 4,121,996 | 10/1978 | Hilfman | 208/111 |
| 4,153,540 | 5/1979 | Gorring et al. | 208/89 |
| 4,175,114 | 11/1979 | Plank et al. | 423/329 |
| 4,179,356 | 12/1979 | O'Hara et al. | 208/111 |
| 4,229,282 | 10/1980 | Peters et al. | 208/111 |
| 4,238,316 | 12/1980 | Mooi et al. | 208/58 |
| 4,292,166 | 9/1981 | Gorring et al. | 208/59 |
| 4,294,687 | 10/1981 | Pinaire et al. | 208/58 |
| 4,309,275 | 1/1982 | Mulaskey | 208/109 |
| 4,310,440 | 1/1982 | Wilson et al. | 423/305 |
| 4,342,641 | 8/1982 | Reif et al. | 208/89 |
| 4,419,271 | 12/1983 | Ward | 208/111 |
| 4,428,862 | 1/1984 | Ward et al. | 208/59 |
| 4,431,517 | 2/1984 | Nevitt et al. | 208/111 |

FOREIGN PATENT DOCUMENTS

| | | |
|---|---|---|
| 2906656 | 8/1979 | Fed. Rep. of Germany. |
| 2024790 | 1/1980 | United Kingdom. |

*Primary Examiner*—John Doll
*Assistant Examiner*—O. Chaudhuri
*Attorney, Agent, or Firm*—Yale S. Finkle; Gregory F. Wirzbicki; Dean Sandford

[57] ABSTRACT

A waxy hydrocarbon feedstock is converted into a high quality lube oil stock of reduced pour point by hydrodewaxing the feedstock in the presence of molecular hydrogen and a hydrodewaxing catalyst under conditions such that the pour point of the feedstock is reduced by selectively converting waxy paraffins into lower molecular weight hydrocarbons. At least a portion of the effluent from the hydrodewaxing zone is then passed to a hydrocracking zone where it is contacted with a hydrocracking catalyst under conditions such that a further reduction in pour point is effected and the overall conversion of components boiling above about 650° F. to components boiling at or below about 650° F. in the hydrodewaxing and hydrocracking steps combined is no more than about 20 percent by volume, preferably no more than about 10 percent by volume.

32 Claims, No Drawings

PROCESS FOR PRODUCING A HIGH QUALITY LUBE OIL STOCK

CROSS REFERENCE TO RELATED APPLICATIONS

This application is a continuation-in-part of U.S. patent application Ser. No. 531,924, filed in the U.S. Patent and Trademark Office on Sept. 13, 1983, now U.S. Pat. No. 4,517,074 which is a divisional of U.S. patent application Ser. No. 084,761 filed in the U.S. Patent and Trademark Office on Oct. 15, 1979 and now U.S. Pat. 4,419,271.

BACKGROUND OF THE INVENTION

The invention relates to a process for converting a waxy hydrocarbon feedstock into a high quality lube oil stock. It is particularly concerned with a process for producing a high quality lube oil stock having a relatively low pour point from a full boiling range shale oil.

Many hydrocarbon liquid feedstocks contain relatively high concentrations of straight chain and slightly branched aliphatic compounds having between 8 and 40 carbon atoms. These long chain compounds tend to crystallize on cooling of the hydrocarbon oil. This cyrstallization is quite frequently sufficient to hinder the flow fo the hydrocarbon liquid and prevent it from being pumped or transmitted from one location to another. The temperature at which the hydrocarbon oil will not flow is commonly referred to as the "pour point" and is determined by standardized test procedures. One such feedstock having a relatively high pour point is the raw oil obtained by retorting oil shale, such as the oil shale found in the Colorado River formation in the western United States.

Oil shale is a mixture of a minor amount of solid organic matter known as kerogen and a major amount of mineral matter. Hydrocarbons are normally recovered from oil shale by subjecting it to heat via pyrolysis or retorting at temperatures between about 850° F. and about 1000° F. These high temperatures cause the kerogen to decompose into liquid and light gaseous hydrocarbonaceous products. The liquids recovered by condensing the oil shale vapors will normally contain a relatively high concentration of straight chain and slightly branched paraffins of high molecular weight. This high concentration of waxy components typically results in the oil having a relatively high pour point, normally between about 50° F. and about 90° F. In addition, the raw shale oil will contain arsenic, organonitrogen constituents and/or organosulfur constituents.

U.S. Pat. No. 4,153,540 teaches a method of upgrading raw shale oil by removing the organonitrogen and organosulfur compounds and also reducing the pour point. The shale oil is treated in a two-step process in which the shale oil is first contacted with a hydrotreating catalyst under conditions such that the concentration of organosulfur and organonitrogen constituents is reduced. The hydrotreated shale oil is then contacted with a hydrodewaxing catalyst under hydrodewaxing conditions in the presence of molecular hydrogen such that the feedstock is hydrodewaxed while its 750° F.+ boiling fraction is converted by at least 50 percent to products boiling below 750° F. The hydrodewaxing catalyst utilized comprises a ZSM-5 zeolite in its hydrogen form combined with a metal having activity for promoting hydrogenation/dehydrogenation reactions. The use of ZSM-5 and related porous, crystalline aluminosilicates results in the conversion of the straight chain and slightly branched paraffins into lower boiling components, thereby decreasing the pour point of the treated oil.

The process described in U.S. Pat. No. 4,153,540 has a serious disadvantage if it is desired to convert the raw shale oil into a lube oil stock of relatively low pour point. Since lube oil stocks normally boil between about 650° F. and about 1000° F., it is undesirable in treating the shale oil to convert a large portion of its higher boiling constituents to lower molecular weight constituents which boil in the gasoline range. It appears, however, that the hydrodewaxing step disclosed in the process of U.S. Pat. No. 4,153,540 is quite nonselective in that not only are waxy paraffins hydrocracked to lower the pour point but 50 percent or more of the 750° F.+ constituents are cracked as well. Such excess hydrocracking results in substantial yield losses when the desired product is a high quality lube oil stock having a relatively low pour point.

In order to avoid excessive yield losses in the process disclosed in U.S. Pat. No. 4,153,540, the catalytic dewaxing step can be carried out with the same catalyst at lower severity conditions. It has been found, however, that although significant yield losses are avoided by this technique, the pour point is not sufficiently decreased. Evidently, under more mild conditions, the catalyst is very selective to cracking of the straight chain paraffins while leaving a large proportion the slightly branched paraffins in the oil.

Accordingly, it is one of the objects of the present invention to provide a process for reducing the pour point of raw shale oil and other waxy hydrocarbon feedstocks without substantially decreasing the yield of lube oil stock constituents boiling in the 650° F.+ range. It is another object to provide such a process having the further advantage of selectively hydrocracking the straight chain and slightly branched paraffins while not substantially hydrocracking other components.

SUMMARY OF THE INVENTION

In accordance with the invention, it has now been found that the pour point of waxy hydrocarbon feedstocks can be substantially decreased without significant losses in lube oil stock constituents by contacting the feedstock with a dewaxing catalyst in a dewaxing zone under conditions sufficient to reduce the pour point of the feedstock by converting waxy paraffins into lower molecular weight hydrocarbons, and then contacting the effluent from the dewaxing zone with molecular hydrogen in the presence of a hydrocracking catalyst under conditions such that a further reduction in pour point is effected. Normally, the overall conversion of 650° F.+ components to components boiling at or below about 650° F. in the dewaxing and the hydrocracking steps combined is no more than about 20 percent by volume, preferably no more than about 10 percent by volume. A high quality lubestock having a reduced pour point is then recovered from the effluent of the hydrocracking zone. Preferably, the waxy hydrocarbon feedstock is a dearsenated, raw shale oil that has been subjected to hydrotreatment to remove organosulfur and organonitrogen compounds.

The dewaxing step of the invention is preferably accomplished under hydrodewaxing conditions. For purposes of the present invention, the distinction between dewaxing conditions and hydrodewaxing conditions is the presence of molecular hydrogen in the latter and the absence of molecular hydrogen in the former.

A preferred hydrodewaxing catalyst for use in the process of the invention includes a Group VIB metal component and/or a Group VIII metal component on a support comprising a mixture of a porous refractory oxide and a crystalline silica polymorph. A preferred hydrocracking catalyst for use in the process of the invention includes a Group VIB metal component and/or a Group VIII metal component on a refractory oxide support comprising silica-alumina dispersed in a matrix of gamma alumina. The support may also contain an aluminosilicate zeolite having catalytic activity for cracking hydrocarbons. Normally, both the hydrodewaxing zone and the hydrocracking zone will be maintained at a pressure between about 500 p.s.i.g. and about 2500 p.s.i.g. and at a temperature between about 500° F. and about 850° F.

The process of the invention provides a method for converting shale oil and other waxy hydrocarbon feedstocks into lube oil stocks having substantially reduced pour points without excessive loss of lube oil boiling constituents. Thus, the process of the invention provides a method for efficiently producing large quantities of high quality lube stocks from raw shale oil.

DETAILED DESCRIPTION OF THE INVENTION

Feedstocks for the process of the invention include waxy raffinates or waxy distillates boiling above about 650° F., usually in the range from about 650° F. to about 1100° F. Such feedstocks, which often have pour points between about 70° F. and 90° F., may be treated in the process of the invention to produce lube stocks of low pour point, typically below about 10° F. The preferred feedstock is a full range shale oil or shale oil fraction that has been deashed, dearsenated and catalytically hydrotreated. One method by which the dearsenation may be carried out is described in U.S. Pat. No. 4,046,674, the disclosure of which is herein incorporated by reference in its entirety. The hydrotreating step is carried out by contacting the deashed and dearsenated shale oil with molecular hydrogen in the presence of a hydrotreating catalyst, which will normally comprise Group VIB and Group VIII metal components on a porus refractory oxide support, under conventional hydrotreating conditions in order to remove organosulfur and organonitrogen compounds by converting them to hydrogen sulfide and ammonia, respectively. When shale oil derived by retorting oil shale found in the Colorado River formation and adjacent areas is subjected to the deashing, dearsenating and hydrotreating in sequence, the shale oil produced will normally have a boiling point range between about 80° F. and about 1030° F., an organonitrogen content of between about 200 wppm and about 3500 wppm, usually between about 300 wppm and 2000 wppm, an organosulfur content between about 30 wppm and 2000 wppm, normally between about 35 wppm and 100 wppm, and a pour point above about 70° F., normally between about 75° F. and 90° F.

Typically, the hydrotreating step will be carried out at normal hydrogenation conditions in a conventional hydrotreating reactor in which the liquid feed is passed downwardly through a packed bed of conventional hydrotreating catalyst. Such catalysts normally comprise an alumina or silica-alumina support carrying one or more Group VIII metals and one or more metals from Group VIB of the Periodic Table of Elements in the form of an oxide or sulfide. Combinations of one or more Groups VIB metal oxides or sulfides with one or more Group VIII metal oxides or sulfides are generally preferred. Normally, the preferred metal constituents are either tungsten or molybdenum in combination with either nickel or cobalt.

In accordance with the invention, the effluent from the hydrotreating reactor is passed to a hydrodewaxing reactor where it is directed downwardly through a bed of hydrodewaxing catalyst in the presence of molecular hydrogen at elevated temperature and pressure. Normally, the temperature in the hydrodewaxing reactor will range between about 500° F. and about 850° F., preferably between about 600° F. and 800° F. The pressure in the reactor will normally be between about 500 p.s.i.g. and about 3,000 p.s.i.g., preferably between about 1,500 p.s.i.g. and about 2,500 p.s.i.g. The rate at which the feedstock is passed through the reactor in contact with the catalyst particles is normally set at a liquid hourly space velocity between about 0.3 and about 8.0, preferably between about 0.5 and about 3.0. The hydrogen flow rate through the reactor is normally above about 5,000 standard cubic feet per barrel of feedstock, preferably between about 2,000 and about 8,000 standard cubic feet per barrel.

The catalyst used in the hydrodewaxing reactor is a dewaxing catalyst which, under the conditions in the reactor, is effective for reducing the pour point of the feedstock by promoting the selective conversion of waxy paraffins, normally paraffins containing straight chains having between about 8 and about 40 carbon atoms, to lower molecular weight hydrocarbons. One type of catalyst suitable for use as the hydrodewaxing catalyst is composed of one or more Group VIB active metal components, particularly the Group VIB metals, metal components, oxides and sulfides, and/or one or more Group VIII metal components, on a support comprising an intimate mixture of a porous refractory oxide an a crystalline silica molecular sieve essentially free of aluminum and other Group IIIA metlas. Normally, the metals utilized will be nickel and/or cobalt constituents in combination with tungsten and/or molybdenum components. Nickel and tunsten components, especially in a sulfide form, are the most preferred metals for use in this catalyst. The porous refractory oxides that can be used include the oxides of difficulty reduceable metals, particularly those containing aluminum. Examples of such refractory oxides include alumina, silica, beryllia, chromia, zirconia, titania, magnesia, thoria and combinations of these refractory oxides such as silica-alumina and silica-titania. The most preferred refractory oxides are alumina and gamma alumina. The Group IIIA metal-free crystalline silica molecular sieve which forms a portion of the support is preferably a material known as silicalite, a silica polymorph that may be prepared by methods described in U.S. Pat. No. 4,061,724, the disclosure of which is hereby incorporated by reference in its entirety. The resultant silicalite will preferably be subjected to combustion to remove organic materials and then ion-exchanged to eliminate traces of alkali metal ions. Silicalite does not share the zeolitic property of substantial ion exchange common to cystalline aluminosilicates and therefore contains essentially no zeolitic metal cations. Unlike the "ZSM-5 family" of zeolites, silicalite is not an aluminosilicate and contains only trace proportions of alumina. A more detailed description of the above-discussed hydrodewaxing catalyst including its method of preparation can be found in U.S. Pat. No. 4,428,862, the disclosure of which is hereby incorporated by reference in its entirety.

Another catalyst which can be used in the hydrodewaxing reactor is somewhat similar to the catalyst described above except that a crystalline aluminosilicate of the ZSM-5 type, preferably in an acidic form, is substituted in the support for the crystalline silica molecular sieve essentially free of Group IIIA metals. The crystalline aluminosilicate zeolite will normally be present in the support as a dispersion in the porous refractory oxide. The crystalline aluminosilicate zeolite may be ZSM-5, ZSM-11, ZSM-12, ZSM-23, ZSM-35, ZSM-38 and the like. ZSM-5 is the most preferred and is fully described in U.S. Pat. No. 3,702,886, the disclosure of which is hereby incorporated by reference in entirety. ZSM-11, ZSM-12, ZSM-23, ZSM-35, and ZSM-38 are all known zeolites and are more fully described respectively in the following U.S. patents, the disclosures of which are hereby incorporated by reference in their entirety: U.S. Pat. Nos. 3,704,979; 3,832,440; 4,076,842; 4.016,245 and 4,046,859. These zeolites are known to readily adsorb benzene and normal paraffins such as n-hexane and also certain mono-branched paraffins, such as isopentane, but have difficulty adsorbing di-branched paraffins, such as 2,2-dimethylbutane, and polyalkylaromatics, such as meta-xylene. These zeolites are also known to have a crystal density of not less than 1.6 grams per cubic centimeter, a silica-to-alumina ratio of at least 12, and a constraint index within the range of 1 to 12. The constraint index is defined in U.S. Pat. No. 4,229,282, the disclosure of which is hereby incorporated by reference in its entirety. The foregoing zeolites have an effective pore diameter greater than 5 Angstroms with the pores defined by 10 membered rings of oxygen atoms, as explained in U.S. Pat. No. 4,247,388, the disclosure of which is herein incorporated by reference in its entirety. Such zeolites are preferably utilized in the acid form by replacing at least some of the ion-exchanged metal cations in the zeolite with hydrogen ions. This exchange may be accomplished directly with an acid or indirectly by ion exchange with ammonium ions followed by calcination to convert the ammonium ions to hydrogen ions. In either case, it is preferred that the exchange be such that a substantial proportion of the ion exchange sites of the zeolite utilized in the catalyst support is occupied with hydrogen ions. Normally, it is desirable to remove any organic impurities from the zeolite by combustion before the above-described ion exchange procedures are carried out.

The support will normally consist essentially of an intimate mixture of the zeolite and a porous refractory oxide such as alumina. The proportion of zeolite in the support may vary in the range between about 2 percent and about 90 percent by weight, but preferably the support consists essentially of a heterogeneous dispersion of zeolite in a matrix of alumina or other porous refractory oxide. Such a dispersion contains the zeolite in a minor proportion, normally between about 15 percent and about 45 percent, preferably between above 20 percent and above 40 percent by weight, with 30 percent being most highly preferred.

This hydrodewaxing catalyst is most preferably prepared in particulate form, with the clover-leaf form shown in FIGS. 8 and 8A of U.S. Pat. No. 4,028,227, the disclosure of which is hereby incorporated by reference in its entirety, being most highly preferred. One convenient method for preparing the catalyst involves first comulling a wetted mixture of zeolite, an alumina gel, and an alumina binder material, such as Catapal ® peptized alumina, in proportions appropriate to what is desired in the final catalyst support. Such a comulled mixture is then extruded through a die having suitable small openings in the shape of circles or ellipses, or, as is preferred, three-leaf clovers. The extruded material is cut into small particulates, dried, and calcined, following which the resulting support particles are impregnated with a liquid solution containing the desired Group VIB element in dissolved form, with other active components, such as nickel, or even with an acidic component, such as phosphorus, known for its property to promote hydrotreating reactions, being optionally included. A specifically contemplated impregnation liquid consists essentially of an aqueous solution of dissolved ammonium metatungstate and nickel nitrate, with the dissolved components being preesnt in the impregnation liquid in proportions sufficient to ensure that the final catalyst contains more than about 15 percent by weight tungsten components calculated as $WO_3$ and more than about 0.5 percent by weight nickel components calculated as NiO. If desired, phosphorus components may also be present in the impregnation liquid so that the final catalyst contains, for example, more than about 0.5 percent by weight phosphorous components calculated as P. After impregnation, the impregnated composite particles are calcined in air at temperatures at or above about 900° F. for a time period sufficient to convert the metal components to oxide forms.

In an alternative method, the foregoing procedure is altered such that, instead of introducing the Group VIB and/or Group VIII metal components into the support by impregnation, they are incorporated into the catalyst by mixing an appropriate solid or liquid containing the desired metal with materials to be extruded through the die. Such a method may prove less expensive and more convenient on a commerical scale than the impregnation method.

Other known methods for depositing the Group VIB and Group VIII metals on the zeolite-containing support may be utilized. It is specifically noted, however, that although the Group VIII metal may undergo some ion exchange with cations in the zeolite during preparation of the catalyst, it is preferred that at least some Group VIII metal be deposited on the support in locations other than the ion exchange sites of the zeolite component. To ensure this result, the catalyst is preferably prepared to contain more than the amount of Group VIII metal that would fully occupy the ion exchange sites of the zeolite component in the catalyst.

Although the two above-described catalysts are preferred for use in the hydrodewaxing reactor, other catalysts which will decrease the pour point of the reactor feed by selectively converting waxy paraffins to lower molecular weight hydrocarbons may be used. One such catalyst comprises a metallic hydrogenation component supported on a mixture of a crystalline aluminum phosphate and a porous refractory oxide as described in U.S. Pat. No. 4,310,440, the disclosure of which is hereby incorporated by reference in its entirety. Examples of other catalysts which may be used include metallic hydrogenation constituents deposited on mordenite, clinoptilolite, or low-potassium erionite. It will be understood that, although all of the hydrodewaxing catalysts described above contain at least one metallic hydrogenation component, the presence of such a component is not necessary and the support without the hydrogenation component may be used as the hydrodewaxing catalyst.

It has been found that the above-discussed hydrodewaxing catalysts tend to crack straight chain paraffins preferentially to slightly branched paraffins. This high selectivity results in the effluent from the hydrodewaxing reactor having a higher than desired pour point. Attempts to reduce the pour point further by operating the hydrodewaxing reactor at more severe conditions is undesirable because a substantial proportion of lube oil constituents, i.e., those components of the feedstock which boil above about 650° F., is converted to lower molecular weight hydrocarbons, thereby resulting in a loss of the desired product. It has now been found that this undesirable loss of lube oil constituents can be avoided while obtaining a further reduction in pour point by contacting the effluent from the hydrodewaxing zone with molecular hydrogen in the presence of a hydrocracking catalyst under conditions such that the overall conversion of 650° F.+ components to components boiling at or below 650° F. in the hydrodewaxing and the hydrocracking steps combined is no more than about 20 percent by volume, preferably no more than about 10 percent by volume.

In accordance with the invention, the entire effluent from the hydrodewaxing reactor, which may include ammonia, hydrogen sulfide and lower molecular weight hydrocarbons, is passed to a hydrocracking reactor where it is contacted with a hydrocracking catalyst in the presence of molecular hydrogen. The contacting is normally accomplished by passing the hydrodewaxing reactor effluent downwardly through the hydrocracking catalyst in a suitable reactor vessel under conditions of elevated temperature and pressure. The temperature in the hydrocracking reactor is normally maintained between about 500° F. and about 850° F., preferably between about 600° F. and about 800° F. The pressure in the reactor is normally between about 500 p.s.i.g and about 3,000 p.s.i.g, preferably between about 1,500 p.s.i.g and about 2,500 p.s.i.g. The liquid hourly space velocity of the feed through the hydrocracking reactor is normally maintained between about 0.3 and about 8.0, preferably between about 0.5 and about 3.0. Hydrogen is passed through the reactor at a rate of about 8,000 standard cubic feet per barrel of feedstock, preferably between about 1,500 and about 10,000 standard cubic feet per barrel.

The catalyst used in the hydrocracking reactor promotes reactions that result in a further reduction in the pour point of the reactor feed under the above described conditions without the overall conversion in the hydrodewaxing and hydrocracking reactors combined being more than about 20 volume percent, preferably no more than about 10 volume percent, of the constituents in the feed boiling above about 650° F. to components boiling at or below 650° F. Normally, such catalysts will be useful for producing middle distillates from heavy gas oils. Examples of such catalysts are disclosed in detail in U.S. Pat. Nos. 4,097,365 and 4,419,271, the disclosures of which are hereby incorporated by reference in their entirety. The catalyst described in U.S. Pat. No. 4,097,365 is a midbarrel hydrocracking catalyst comprising hydrogenation components on a refractory oxide support comprising silica-alumina dispersed in a matrix of gamma alumina. The catalyst described in U.S. Pat. No. 4,419,271 is an improvement of the previous catalyst in which a crystalline aluminosilicate zeolite having cracking activity, such as hydrogen Y-zeolite or a rare earth-exchanged Y-zeolite, is included in the support. The hydrogenation components in both catalysts are the metals, oxides and sulfides of the Group VIII and/or the Group VIB elements. The most suitable hydrogenation components are selected from the group consisting of the metals, oxides and sulfides of platinum, palladium, cobalt, nickel, tungsten and molybdenum. Preferably, at least one Group VIII metal component and at least one Group VIB metal component are utilized, with the preferred combination being a nickel and/or cobalt component with a molybdenum and/or tungsten component.

The hydrogenation component or components are intimately composited on a base support comprising a mixture of a heterogeneous dispersion of finely divided silica-alumina in a matrix of alumina, preferably gamma alumina. The catalyst of U.S. Pat. No. 4,419,271 also contains, in intimate mixture with the dispersion, a suitable zerolite having catalytic activity for cracking hydrocarbons. These zeolites include naturally occuring and synthetic crystalline aluminosilicates such as faujasite, mordenite, erionite, Zeolite Y, Zeolite X, Zeolite L, Zeolite Omega, Zeolite ZSM-4 and their modifications. These and other such zeolitic molecular sieves are known to have activity for cracking hydrocarbons when a substantial portion of their ion exchange sites are occupied with hydrogen ions or multivalent metal-containing cations particularly rare earth cations. A preferred zeolite for use in the support is a Y zeolite that has been ion-exchanged with ammonium ions and then steam-stabilized in accordance with the procedure set forth in U.S. Pat. No. 3,929,672 the disclosure of which is hereby incorporated by reference in its entirety. The most preferred zeolite for use in the support is a material known as LZ-10, a zeolitic molecular sieve available from Union Carbide, Linde Division. LZ-10 is a modified Y zeolite having a silica-to-alumina ratio between about 3.5 and about 4.0, a surface area between about 500 and about 700 m2/gram, a unit cell size between about 24.25 and 24.35 Angstroms, a water adsorption capacity less than about 8 percent by weight, preferably less than about 5 percent by weight, of the zeolite, and an ion-exchange capacity less than 20 percent of that of a sodium Y zeolite of comparable silica-to-alumina ratio.

A large portion of the effluent from the hydrocracking reactor will be liquids boiling in the range between about 650° F. and about 1000° F. that are substantially free of waxy paraffinic hydrocarbons and therefore will have a relatively low pour point. This fraction having a low pour point is a high quality lube stock and may be recovered from the hydrocracking zone effluent by passing the effluent to a fractionating tower where the lube oil constituents are separated from the lower boiling constituents. The lube oil constituents can then be blended with other lube oil stocks to produce a lube oil of desired characteristics. The lower boiling materials are recovered and may be as desired.

In the embodiment of the invention described above, the entire effluent from the hydrotreating zone is passed to the hydrodewaxing zone and the entire effluent from the hydrodewaxing zone is passed to the hydrocracking zone. It will be understood that the process of the invention is not limited to this particular flow scheme. For example, it may be desirable to remove ammonia, hydrogen sulfide and gaseous hydrocarbons from the effluent of the hydrotreating zone, the hydrodewaxing zone or both. It may also be advisable in some instances to distill the effluent from either zone or both zones to remove liquid hydrocarbons boiling below about 650° F. Although in the embodiment of the invention described above, the effluent from the hydrotreating zone is passed into a separate hydrodewaxing reactor and then to a separate hydrocracking reactor, it will be understood that these two reactors can be combined into one vessel containing two beds of different catalysts arranged such that the effluent from the hydrotreating zone would first pass through the hydrodewaxing catalyst bed and then through the hydrocracking catalyst bed. This embodiment of the invention would eliminate the need for a second reactor vessel.

Although this invention has been primarily described in conjunction with a preferred embodiment thereof, it is evident that many alternatives, modifications, and variations will be apparent to those skilled in the art in the light of the foregoing description. Accordingly, it is intended to embrace within the invention all such variations, modifications and alternatives as are within the spirit and scope of the appended claims.

I claim:

1. A process for converting a waxy hydrocarbon feedstock into a high quality lube oil stock which comprises:
   (a) contacting said waxy hydrocarbon feedstock with molecular hydrogen in the presence of a hydrotreating catalyst in a hydrotreating zone under conditions such that the concentration of organosulfur and organonitrogen components is reduced;
   (b) contacting the effluent from said hydrotreating zone with molecular hydrogen in the presence of a hydrodewaxing catalyst in a hydrodewaxing zone under conditions such that the pour point of the hydrotreated feedstock from step (a) is reduced, wherein said hydrodewaxing catalyst comprises a molecular sieve containing pores defined by 10-membered rings of oxygen atoms and is selected from the group consisting of (1) a mixture of a porous refractory oxide and a crystalline silica polymorph and (2) a mixture of a porous refractory oxide and a crystalline zeolite of the ZSM-5 type;
   (c) contacting the effluent from said hydrodewaxing zone with molecular hydrogen in the presence of a hydrocracking catalyst in a hydrocracking zone under conditions such that a further reduction in pour point is effected, wherein said hydrocracking catalyst comprises at least one hydrogenation component selected from the group consisting of a Group VIB metal component and a Group VIII metal component on a support comprising a crystalline aluminosilicate Y zeolite having activity for cracking hydrocarbons and a porous refractory oxide comprising silica-alumina dispersed in a matrix of gamma alumina; and
   (d) recovering a high quality lube oil stock from the effluent of said hydrocracking zone.

2. A process as defined by claim 1 wherein said hydrotreating catalyst comprises a Group VIB metal component and Group VIII metal component on a refractory oxide support.

3. A process as defined by claim 1 wherein said crystalline aluminosilicate Y zeolite comprises a Y zeolite having a water adsorption capacity, at 4.6 mm Hg water vapor partial pressure and 25° C., less than about 8 percent by weight of said zeolite.

4. A process as defined by claim 1 wherein said crystalline aluminosilicate Y zeolite comprises a Y zeolite that has been ion-exchanged with ammonium ions and then steam-stabilized.

5. A process as defined by claim 1 wherein said waxy hydrocarbon feedstock comprises a dearsenated shale oil.

6. A process as defined by claim 1 wherein said hydrodewaxing catalyst further comprises a Group VIB metal component and a Group VIII metal component.

7. A process as defined by claim 1 wherein the effluent from said hydrotreating zone is treated to remove liquids boiling below about 650° F., ammonia, hydrogen sulfide, and light hydrocarbon gases, and the remaining portion of said effluent is passed to said hydrodewaxing zone.

8. A process as defined by claim 1 wherein the effluent from said hydrodewaxing zone is treated to remove liquids boiling below about 650° F., ammonia, hydrogen sulfide, and light hydrocarbon gases, and the remaining portion of said effluent is passed to said hydrocracking zone.

9. A process as defined by claim 1 wherein said crystalline aluminosilicate Y zeolite comprises LZ-10 zeolite.

10. A process for converting a waxy hydrocarbon feedstock containing a substantial proportion of hydrocarbonaceous material boiling above about 650° F. into a high quality lube oil stock which comprises:
    (a) contacting said waxy hydrocarbon feedstock with a dewaxing catalyst in a dewaxing zone under conditions such that the pour point of said feedstock is reduced, said dewaxing catalyst comprising a molecular sieve containing pores defined by 10-membered rings of oxygen atoms;
    (b) contacting at least a portion of the effluent from said dewaxing zone with molecular hydrogen in the presence of a hydrocracking catalyst in a hydrocracking zone under conditions such that a further reduction in pour point is effected, wherein said hydrocracking catalyst comprises at least one hydrogenation component selected from the group consisting of Group VIB metal components and Group VIII metal components on a support comprising a crystalline aluminosilicate Y zeolite having catalytic activity for cracking hydrocarbons and a porous refractory oxide comprising silica-alumina dispersed in a matrix of gamma alumina; and
    (c) recovering a high quality lube oil stock from the effluent of said hydrocracking zone.

11. A process as defined by claim 10 wherein said dewaxing catalyst comprises a mixture of a porous refractory oxide and a crystalline aluminum phosphate containing pores defined by 10-membered rings of oxygen atoms.

12. A process as defined by claim 11 wherein at least one hydrogenation component selected from the group consisting of Group VIB metal components and Group VIII metal components is supported on said mixture.

13. A process as defined by claim 12 wherein a Group VIB metal hydrogenation component and a Group VIII metal hydrogenation component are supported on said mixture.

14. A process as defined by claim 10 wherein the effluent from said dewaxing zone is treated to remove ammonia, hydrogen sulfide and light hydrocarbon gases prior to contacting said effluent with molecular hydrogen in said hydrocracking zone.

15. A process as defined by claim 10 wherein said hydrocracking catalyst contains a Group VIB metal hydrogenation component and a Group VIII metal hydrogenation component.

16. A process as defined by claim 10 wherein said zeolite comprises a crystalline aluminosilicate Y zeolite having a water adsorption capacity, at 4.6 mm Hg. Water vapor partial pressure and 25° C., less than about 8 percent by weight of said zeolite.

17. A process as defined by claim 10 wherein the effluent from said dewaxing zone is treated to remove liquids boiling below about 650° F. prior to contacting said effluent with molecular hydrogen in said hydrocracking zone.

18. A process as defined by claim 10 wherein said waxy hydrocarbon feedstock is contacted with molecular hydrogen in said dewaxing zone.

19. A process as defined by claim 10 wherein said crystalline aluminosilicate Y zeolite comprises LZ-10 zeolite.

20. A process as defined by claim 10 wherein said waxy hydrocarbon feedstock comprises a dearsenated shale oil which has been hydrotreated to remove organonitrogen and organosulfur components.

21. A process as defined by claim 10 wherein said dewaxing catalyst comprises a mixture of a porous refractory oxide and a crystalline silica polymorph.

22. A process as defined by claim 21 wherein at least one hydrogenation component selected from the group consisting of Group VIB metal components and Group VIII metal components is supported on said mixture.

23. A process as defined by claim 22 wherein a Group VIB metal hydrogenation component and a Group VIIi metal hydrogenation component are supported on said mixture.

24. A process as defined by claim 23 wherein said Group VIB metal hydrogenation component comprises a tungsten component or a molybdenum component and said Group VIII metal hydrogenation component comprises a nickel component or a cobalt component.

25. A process as defined by claim 21 wherein said silica polymorph comprises silicalite.

26. A process as defined by claim 10 wherein said dewaxing catalyst comprises an intimate mixture of a porous refractory oxide and a crystalline zeolite of the ZSM-5 type.

27. A process as defined by claim 26 wherein at least one hydrogenation component selected from the group consisting of Group VIB metal components and Group VIII metal components is supported on said intimate mixture.

28. A process as defined by claim 26 wherein said zeolite of the ZSM-5 type is selected from the group consisting of ZSM-5, ZSM-11, ZSM-12, ZSM-23, ZSM-35 and ZSM-38.

29. A process as defined by claim 27 wherein a Group VIB metal hydrogenation component and a Group VIII metal hydrogenation component are supported on said intimate mixture.

30. A process as defined by claim 29 wherein said Group VIB metal hydrogenation component comprises a tungsten component or molybdenum component and said Group VIII metal hydrogenation component comprises a nickel component or cobalt component.

31. A process as defined by claim 15 wherein said Group VIB metal hydrogenation component comprises a tungsten component or molybdenum component and said Group VIII metal hydrogenation component comprises a nickel component or a cobalt component.

32. A process as defined by claim 10 wherein said dewaxing zone and said hydrocracking zone are maintained in the same reactor.

* * * * *

UNITED STATES PATENT AND TRADEMARK OFFICE
CERTIFICATE OF CORRECTION

PATENT NO. : 4,648,958
DATED : 03/10/87
INVENTOR(S) : John W. Ward

It is certified that error appears in the above-identified patent and that said Letters Patent are hereby corrected as shown below:

Col. 1, lines 25 and 26, delete "cyrstallization" and insert therefor --crystallization--; line 27, delete "fo" and insert therefor --of--.

Col. 4, line 40, between "components," and "on" insert the phrase --particularly Group VIII metals, oxides and sulfides,--.

Col. 8, line 22, delete "zerolite" and insert therefor --zeolite--.

Col. 11, claim 23, line 36, delete "VIIi" and insert therefor --VIII--.

Signed and Sealed this

Tenth Day of November, 1987

Attest:

DONALD J. QUIGG

Attesting Officer

Commissioner of Patents and Trademarks